(12) United States Patent
Edwards et al.

(10) Patent No.: US 9,998,344 B2
(45) Date of Patent: *Jun. 12, 2018

(54) PROTECTION STATUS DETERMINATIONS FOR COMPUTING DEVICES

(71) Applicant: eFolder, Inc., Atlanta, GA (US)

(72) Inventors: William Scott Edwards, San Jose, CA (US); Teresa Aguilera, San Francisco, CA (US)

(73) Assignee: eFolder, Inc., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/019,951

(22) Filed: Feb. 9, 2016

(65) Prior Publication Data

US 2016/0162349 A1 Jun. 9, 2016

Related U.S. Application Data

(63) Continuation of application No. 13/789,565, filed on Mar. 7, 2013, now Pat. No. 9,397,907.

(51) Int. Cl.
| | |
|---|---|
| *G06F 15/173* | (2006.01) |
| *H04L 12/26* | (2006.01) |
| *G06F 11/07* | (2006.01) |
| *G06F 11/14* | (2006.01) |
| *G06F 11/30* | (2006.01) |
| *G06F 11/32* | (2006.01) |

(52) U.S. Cl.
CPC ............ *H04L 43/08* (2013.01); *G06F 11/079* (2013.01); *G06F 11/1461* (2013.01); *G06F 11/3055* (2013.01); *G06F 11/324* (2013.01); *G06F 11/3006* (2013.01); *G06F 2201/81* (2013.01)

(58) Field of Classification Search
CPC ............ G06F 11/1469; G06F 11/1451; G06F 11/1461; G06F 11/1448; G06F 2201/84; G06F 11/1466; G06F 17/30082; H04L 67/1008; H04L 67/1002; H04L 67/101
See application file for complete search history.

(56) References Cited

U.S. PATENT DOCUMENTS

| | | | |
|---|---|---|---|
| 5,379,412 A | 1/1995 | Eastridge et al. |
| 5,574,905 A | 11/1996 | deCarmo |
| 5,860,107 A | 1/1999 | Patel |
| 6,122,629 A | 9/2000 | Walker et al. |
| 6,205,527 B1 | 3/2001 | Goshey et al. |
| 6,233,589 B1 | 5/2001 | Balcha et al. |
| 6,272,492 B1 | 8/2001 | Kay |

(Continued)

OTHER PUBLICATIONS

Li et al., "Efficient File Replication," U.S. Appl. No. 13/671,498, filed Nov. 7, 2012.

(Continued)

*Primary Examiner* — Benjamin M Thieu
(74) *Attorney, Agent, or Firm* — Morris, Manning & Martin, LLP; Daniel E. Sineway; R. Lee Strasburger, Jr.

(57) ABSTRACT

Systems, methods, and media that provide backup protection statuses for computing devices are provided herein. Some methods may include determining a backup status for a first computing device, assigning a protection status for the first computing device based upon a comparison of the backup status and a compliance schema for the first computing device, and transmitting the protection status to a monitoring device utilized by an end user.

19 Claims, 12 Drawing Sheets

(56) References Cited

U.S. PATENT DOCUMENTS

| | | |
|---|---|---|
| 6,411,985 B1 | 6/2002 | Fujita et al. |
| 6,604,236 B1 | 8/2003 | Draper et al. |
| 6,629,110 B2 | 9/2003 | Cane et al. |
| 6,651,075 B1 | 11/2003 | Kusters et al. |
| 6,971,018 B1 | 11/2005 | Witt et al. |
| 7,024,581 B1 | 4/2006 | Wang et al. |
| 7,085,904 B2 | 8/2006 | Mizuno et al. |
| 7,266,655 B1 | 9/2007 | Escabi, II et al. |
| 7,401,192 B2 | 7/2008 | Stakutis et al. |
| 7,406,488 B2 | 7/2008 | Stager et al. |
| 7,546,323 B1 | 6/2009 | Timmins |
| 7,620,765 B1 | 11/2009 | Ohr et al. |
| 7,631,155 B1 | 12/2009 | Bono et al. |
| 7,647,338 B2 | 1/2010 | Lazier et al. |
| 7,676,763 B2 | 3/2010 | Rummel |
| 7,730,425 B2 | 6/2010 | de los Reyes et al. |
| 7,743,038 B1 | 6/2010 | Goldick |
| 7,752,487 B1 | 7/2010 | Feeser et al. |
| 7,769,731 B2 | 8/2010 | O'Brien |
| 7,797,582 B1 | 9/2010 | Stager et al. |
| 7,809,688 B2 | 10/2010 | Cisler et al. |
| 7,832,008 B1 | 11/2010 | Kraemer |
| 7,844,850 B2 | 11/2010 | Yasuzato |
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1 | 11/2011 | Afonso et al. |
| 8,099,391 B1 | 1/2012 | Monckton |
| 8,099,572 B1 | 1/2012 | Arora et al. |
| 8,117,163 B2 | 2/2012 | Brown et al. |
| 8,200,926 B1 | 6/2012 | Stringham |
| 8,224,935 B1 | 7/2012 | Bandopadhyay et al. |
| 8,244,678 B1 | 8/2012 | Hartland et al. |
| 8,244,914 B1 | 8/2012 | Nagarkar |
| 8,245,156 B2 | 8/2012 | Mouilleseaux et al. |
| 8,260,742 B2 | 9/2012 | Cognigni et al. |
| 8,279,174 B2 | 10/2012 | Jee et al. |
| 8,296,410 B1 | 10/2012 | Myhill et al. |
| 8,321,688 B2 | 11/2012 | Auradkar et al. |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 | 3/2013 | O'Shea et al. |
| 8,407,190 B2 | 3/2013 | Prahlad et al. |
| 8,412,680 B1 | 4/2013 | Gokhale et al. |
| 8,417,674 B2 | 4/2013 | Provenzano |
| 8,504,785 B1 | 8/2013 | Clifford et al. |
| 8,549,432 B2 | 10/2013 | Warner |
| 8,554,918 B1 | 10/2013 | Douglis |
| 8,572,337 B1 | 10/2013 | Gokhale et al. |
| 8,589,350 B1 | 11/2013 | Lalonde et al. |
| 8,589,913 B2 | 11/2013 | Jelvis et al. |
| 8,600,947 B1 | 12/2013 | Freiheit et al. |
| 8,601,389 B2 | 12/2013 | Schulz et al. |
| 8,606,752 B1 | 12/2013 | Beatty et al. |
| 8,639,917 B1 | 1/2014 | Ben-Shaul et al. |
| 8,676,273 B1 | 3/2014 | Fujisaki |
| 8,745,003 B1 | 6/2014 | Patterson |
| 8,886,611 B2 | 11/2014 | Caputo |
| 8,924,360 B1 | 12/2014 | Caputo |
| 8,954,544 B2 | 2/2015 | Edwards |
| 9,104,621 B1 | 8/2015 | Caputo |
| 9,110,964 B1 | 8/2015 | Shilane et al. |
| 9,213,607 B2 | 12/2015 | Lalonde et al. |
| 9,235,474 B1 | 1/2016 | Petri et al. |
| 9,292,153 B1 | 3/2016 | Edwards et al. |
| 9,397,907 B1 | 7/2016 | Edwards et al. |
| 9,559,903 B2 | 1/2017 | Edwards |
| 2001/0034737 A1 | 10/2001 | Cane et al. |
| 2001/0056503 A1 | 12/2001 | Hibbard |
| 2002/0124124 A1 | 9/2002 | Matsumoto |
| 2002/0169740 A1 | 11/2002 | Korn |
| 2003/0011638 A1 | 1/2003 | Chung |
| 2003/0158873 A1 | 8/2003 | Sawdon et al. |
| 2003/0177293 A1 | 9/2003 | Bilak et al. |
| 2003/0208492 A1 | 11/2003 | Winiger et al. |
| 2004/0030852 A1* | 2/2004 | Coombs ............ G06F 11/1448 |
| | | 711/162 |
| 2004/0044707 A1 | 3/2004 | Richard |
| 2004/0073560 A1 | 4/2004 | Edwards |
| 2004/0073677 A1* | 4/2004 | Honma ................ G06F 3/0604 |
| | | 709/226 |
| 2004/0093474 A1 | 5/2004 | Lin et al. |
| 2004/0098423 A1* | 5/2004 | Chigusa ............. G06F 11/1461 |
| 2004/0233924 A1 | 11/2004 | Bilak et al. |
| 2004/0260973 A1 | 12/2004 | Michelman |
| 2005/0010835 A1 | 1/2005 | Childs et al. |
| 2005/0027748 A1 | 2/2005 | Kisley |
| 2005/0114290 A1 | 5/2005 | Borthakur et al. |
| 2005/0154937 A1 | 7/2005 | Achiwa |
| 2005/0171979 A1 | 8/2005 | Stager et al. |
| 2005/0223043 A1 | 10/2005 | Randal et al. |
| 2005/0273654 A1 | 12/2005 | Chen et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0047720 A1 | 3/2006 | Kulkarni et al. |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0038884 A1* | 2/2007 | Campbell ........... G06F 11/1464 |
| | | 714/4.11 |
| 2007/0061385 A1 | 3/2007 | Clark et al. |
| 2007/0112895 A1 | 5/2007 | Ahrens et al. |
| 2007/0113032 A1* | 5/2007 | Kameyama ......... G06F 11/1076 |
| | | 711/162 |
| 2007/0143497 A1* | 6/2007 | Kottomtharayil . G06F 17/30067 |
| | | 709/238 |
| 2007/0176898 A1 | 8/2007 | Suh |
| 2007/0179995 A1* | 8/2007 | Prahlad ............. G06F 17/30528 |
| 2007/0180207 A1 | 8/2007 | Garfinkle |
| 2007/0198789 A1 | 8/2007 | Clark et al. |
| 2007/0204166 A1 | 8/2007 | Tome et al. |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0250302 A1 | 10/2007 | Xu et al. |
| 2007/0260842 A1 | 11/2007 | Faibish et al. |
| 2007/0276916 A1 | 11/2007 | McLoughlin et al. |
| 2007/0283017 A1 | 12/2007 | Anand et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1 | 1/2008 | Faibish et al. |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorti et al. |
| 2008/0133622 A1 | 6/2008 | Brown et al. |
| 2008/0141060 A1 | 6/2008 | Tanaka et al. |
| 2008/0154979 A1* | 6/2008 | Saitoh ................ G06F 11/1461 |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1 | 9/2008 | Tillgren |
| 2008/0307345 A1 | 12/2008 | Hart et al. |
| 2008/0307527 A1 | 12/2008 | Kaczmarski et al. |
| 2009/0089253 A1 | 4/2009 | Huang et al. |
| 2009/0094427 A1* | 4/2009 | Sano .................. G06F 12/2069 |
| | | 711/162 |
| 2009/0164527 A1 | 6/2009 | Spektor et al. |
| 2009/0185500 A1 | 7/2009 | Mower et al. |
| 2009/0216973 A1 | 8/2009 | Nakajima et al. |
| 2009/0248755 A1* | 10/2009 | Watanabe ............ G06F 1/3209 |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0077165 A1 | 3/2010 | Lu et al. |
| 2010/0095077 A1 | 4/2010 | Lockwood |
| 2010/0104105 A1 | 4/2010 | Schmidt et al. |

(56) References Cited

U.S. PATENT DOCUMENTS

| | | |
|---|---|---|
| 2010/0107155 A1 | 4/2010 | Banerjee et al. |
| 2010/0114832 A1 | 5/2010 | Lillibridge et al. |
| 2010/0165947 A1 | 7/2010 | Taniuchi et al. |
| 2010/0179941 A1* | 7/2010 | Agrawal ............. G06F 11/1451 707/624 |
| 2010/0179973 A1 | 7/2010 | Carruzzo |
| 2010/0192103 A1 | 7/2010 | Cragun et al. |
| 2010/0205152 A1 | 8/2010 | Ansari |
| 2010/0228999 A1 | 9/2010 | Maheshwari et al. |
| 2010/0235831 A1 | 9/2010 | Dittmer |
| 2010/0262637 A1 | 10/2010 | Akagawa et al. |
| 2010/0268689 A1 | 10/2010 | Gates et al. |
| 2010/0318748 A1 | 12/2010 | Ko et al. |
| 2010/0325377 A1 | 12/2010 | Lango et al. |
| 2010/0332454 A1 | 12/2010 | Prahlad et al. |
| 2011/0041004 A1 | 2/2011 | Miwa et al. |
| 2011/0047405 A1 | 2/2011 | Marowsky-Bree et al. |
| 2011/0055399 A1 | 3/2011 | Tung et al. |
| 2011/0055471 A1 | 3/2011 | Thatcher et al. |
| 2011/0055500 A1 | 3/2011 | Sasson et al. |
| 2011/0082998 A1 | 4/2011 | Boldy et al. |
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0264785 A1 | 10/2011 | Newman et al. |
| 2011/0265143 A1 | 10/2011 | Grube et al. |
| 2011/0295811 A1* | 12/2011 | Cherkasova ........ G06F 11/3419 707/654 |
| 2011/0302502 A1 | 12/2011 | Hart et al. |
| 2012/0013540 A1 | 1/2012 | Hogan |
| 2012/0065802 A1 | 3/2012 | Seeber et al. |
| 2012/0084501 A1 | 4/2012 | Watanabe et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2012/0210398 A1 | 8/2012 | Triantafillos et al. |
| 2012/0215743 A1* | 8/2012 | Triantafillos ........ G06F 11/1448 707/654 |
| 2013/0018946 A1 | 1/2013 | Brown et al. |
| 2013/0024426 A1 | 1/2013 | Flowers et al. |
| 2013/0036095 A1 | 2/2013 | Titchener et al. |
| 2013/0091183 A1 | 4/2013 | Edwards et al. |
| 2013/0091471 A1 | 4/2013 | Gutt et al. |
| 2013/0166511 A1 | 6/2013 | Ghatty et al. |
| 2013/0234402 A1* | 9/2013 | Fietz ..................... F16J 15/002 277/549 |
| 2013/0238562 A1* | 9/2013 | Kumarasamy .... G06F 17/30088 707/649 |
| 2013/0238752 A1 | 9/2013 | Park et al. |
| 2013/0318046 A1 | 11/2013 | Clifford et al. |
| 2014/0006858 A1 | 1/2014 | Helfman et al. |
| 2014/0032498 A1 | 1/2014 | Lalonde et al. |
| 2014/0040580 A1* | 2/2014 | Kripalani ................ G06F 3/065 711/162 |
| 2014/0047081 A1 | 2/2014 | Edwards |
| 2014/0052694 A1 | 2/2014 | Dasari et al. |
| 2014/0053022 A1 | 2/2014 | Forgette et al. |
| 2014/0089619 A1 | 3/2014 | Khanna et al. |
| 2014/0101113 A1 | 4/2014 | Zhang et al. |
| 2014/0149358 A1 | 5/2014 | Aphale et al. |
| 2014/0189680 A1 | 7/2014 | Kripalani |
| 2014/0201137 A1* | 7/2014 | Vibhor ................ H04L 29/0854 707/610 |
| 2014/0201144 A1* | 7/2014 | Vibhor ................ H04L 29/0854 707/634 |
| 2014/0244599 A1 | 8/2014 | Zhang et al. |
| 2014/0303961 A1 | 10/2014 | Leydon et al. |
| 2015/0046404 A1 | 2/2015 | Caputo |
| 2015/0095691 A1 | 4/2015 | Edwards |
| 2016/0054911 A1 | 2/2016 | Edwards et al. |
| 2016/0055062 A1 | 2/2016 | Petri et al. |
| 2016/0105312 A1 | 4/2016 | Edwards |
| 2016/0110261 A1 | 4/2016 | Parab et al. |
| 2017/0075719 A1 | 3/2017 | Scallan et al. |
| 2017/0090786 A1 | 3/2017 | Parab et al. |

OTHER PUBLICATIONS

Advisory Action, dated Feb. 7, 2017, U.S. Appl. No. 14/977,581, filed Dec. 21, 2015.

Final Office Action, dated Feb. 9, 2017, U.S. Appl. No. 14/522,527, filed Oct. 23, 2014.

Final Office Action, dated Mar. 6, 2017, U.S. Appl. No. 13/633,695, filed Oct. 2, 2012.

Non-Final Office Action, dated Mar. 22, 2017, U.S. Appl. No. 14/864,850, filed Sep. 24, 2015.

Advisory Action, dated Mar. 30, 2017, U.S. Appl. No. 14/977,581, filed Dec. 21, 2015.

Notice of Allowance, dated Apr. 6, 2017, U.S. Appl. No. 13/889,164, filed May 7, 2013.

Petri, Robert et al., "Cloud Storage Using Merkle Trees," U.S. Appl. No. 13/889,164, 33 pages.

* cited by examiner

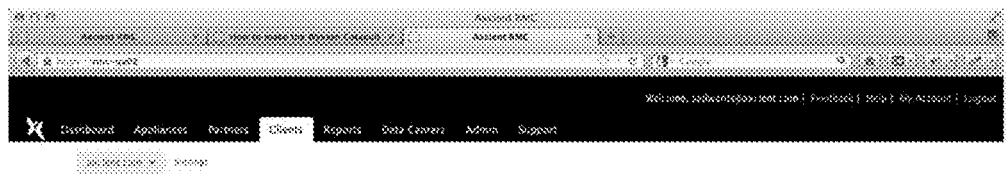
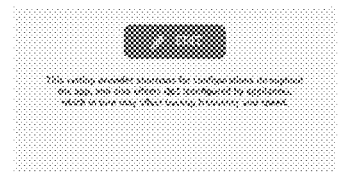
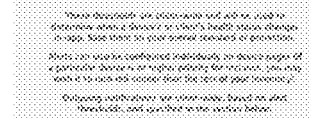
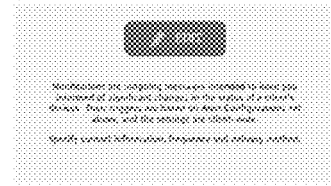
FIG. 2

FIG. 6B

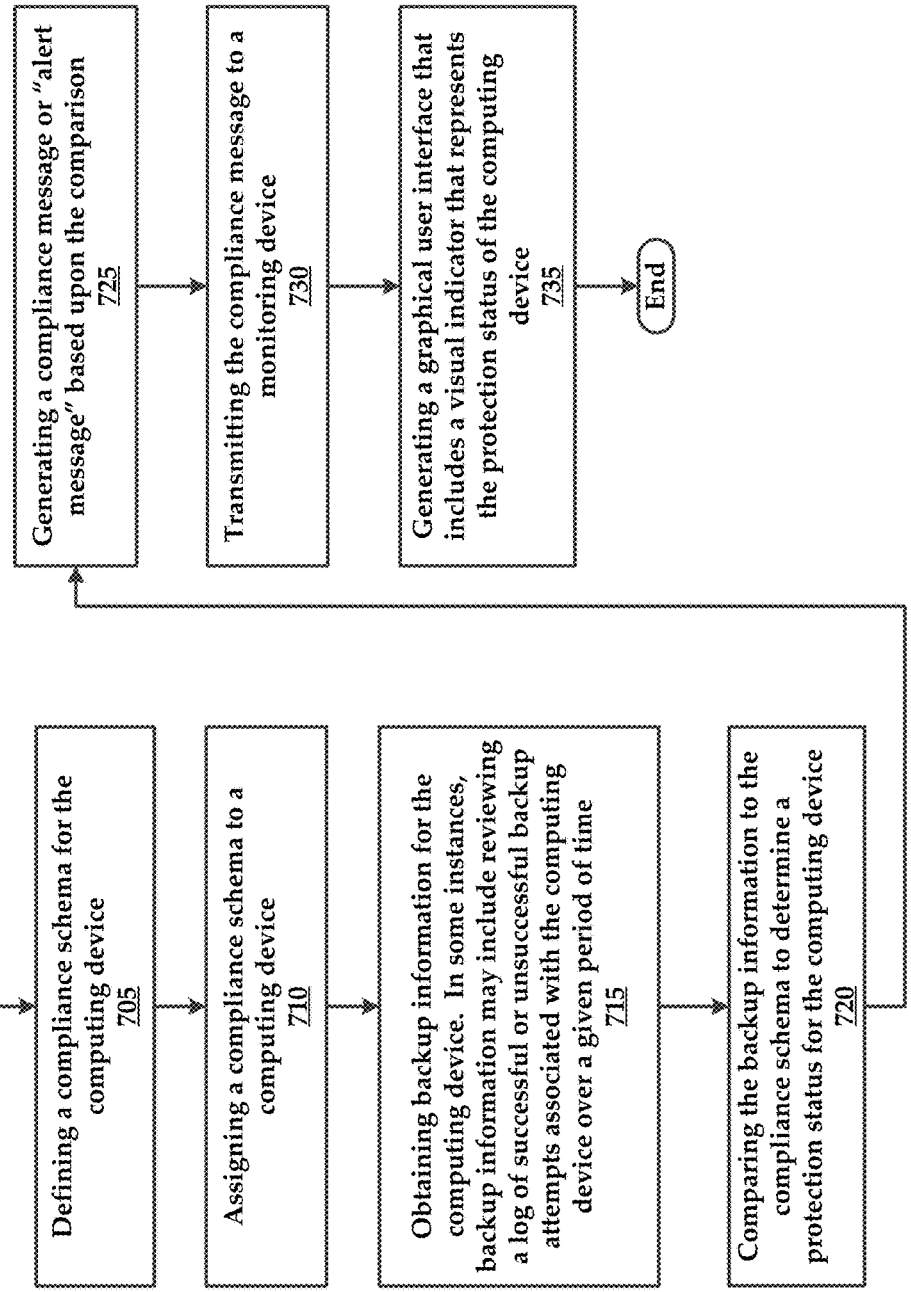

PROTECTION STATUS DETERMINATIONS FOR COMPUTING DEVICES

FIELD OF THE INVENTION

This utility patent application is a continuation of U.S. patent application Ser. No. 13/789,565, filed on Mar. 7, 2013 titled "Protection Status Determinations for Computing Devices", which is hereby incorporated by reference herein in its entirety, including all references and appendices cited therein.

The present technology may be generally described as providing systems and methods that allow for assessment and display of protection statuses for computing devices using graphical user interfaces or other notification methods.

BACKGROUND

Physical devices such as hard drives are often backed up to remote storage systems, which may also comprise cloud-based storage media. Common methods for backing up physical devices over time include the capturing of mirrors (e.g., snapshots) as well as incremental files that represent changes to files of a physical device that occur between mirror captures. Regardless of backup methodology, it is often difficult for system administrators to effectively monitor the protection statuses of various computing devices within a network.

SUMMARY OF THE PRESENT TECHNOLOGY

According to some embodiments, the present technology may be directed to methods that comprise: (a) obtaining a backup status for a first computing device; (b) assigning a protection status for the first computing device based upon a comparison of the backup status and a compliance schema for the first computing device; and (c) transmitting the protection status to a monitoring device utilized by an end user.

According to various embodiments, the present technology may be directed to methods that comprise: (a) assigning a compliance schema to a computing device; (b) obtaining backup information for the computing device; (c) comparing the backup information to the compliance schema; (d) generating a compliance message based upon the comparison; and (e) transmitting the compliance message to a monitoring device.

According to exemplary embodiments, the present technology may be directed to systems that may comprise: (a) one or more processors; and (b) logic encoded in one or more tangible media for execution by the one or more processors and when executed operable to perform operations comprising: (i) obtaining a backup status for a first computing device; (ii) assigning a protection status for the first computing device based upon a comparison of the backup status and a compliance schema for the first computing device; and (iii) generating a graphical user interface that includes the protection status.

According to other embodiments, the present technology may be directed to a non-transitory machine-readable storage medium having embodied thereon a program. In some embodiments the program may be executed by a machine to perform a method for determining a protection status for a computing device. The method may comprise: (a) obtaining a backup status for a first computing device; (b) assigning a protection status for the first computing device based upon a comparison of the backup status and a compliance schema for the first computing device; and (c) transmitting the protection status to a monitoring device utilized by an end user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 2 is an exemplary graphical user interface in the form of a compliance schema interface;

FIGS. 6A-D each illustrate an exemplary graphical user interface that include listings of computing devices which have been categorized according to their protection statuses;

FIG. 7 is a flowchart of an exemplary method for determining and displaying a protection status for a computing device.

DESCRIPTION OF EXEMPLARY EMBODIMENTS

Figure 1:
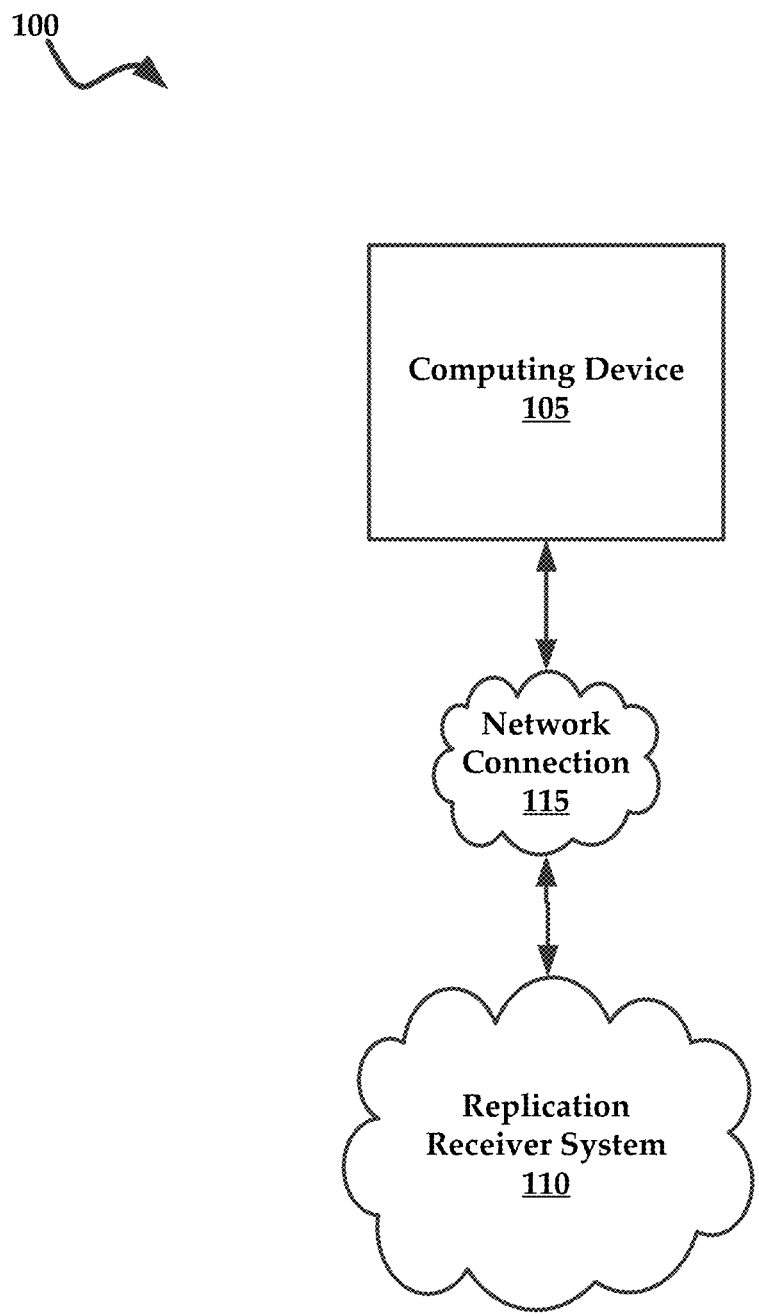
FIG. 1 is a block diagram of an exemplary architecture in which embodiments according to the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to systems and methods for analyzing and displaying a protection status for one or more end user computing devices. Broadly, a protection status may represent whether backup services for a computing device are being executed in accordance with a compliance schema established for the computing device. A compliance schema may include, for example, a backup schedule which delineates how often a backup (e.g., a snapshot or incrementals) is executed (e.g., obtained) for or from the computing device.

In some embodiments, a compliance schema may be applied to a plurality of computing devices. Alternatively, a custom compliance schema may be applied to one or more computing devices out of the plurality of computing devices. According to some embodiments, a compliance schema may be stored as a template.

The present technology may monitor or obtain a backup status for a computing device and compare the backup status to the compliance schema which is associated with the computing device. This comparison may be referred to as a protection status. As will be described in greater detail below, the protection status may include not only the comparison of the backup status with the compliance schema, but also related information such as network connectivity information, and entitlement capacity information. If the protection status indicates that the computing device has not been backed up in accordance with the compliance schema, these and other types of related information may be utilized to locate or determine an explanation for why the computing device has not been backed up properly. The protection status may be utilized to generate alert messages that are transmitted to system administrators or other responsible parties. Additionally, the present technology may generate graphical user interfaces (GUI) that allow end users to view a protection status(es) of one or more computing devices. A GUI may also be generated that allows the end user to input compliance schema preferences. For example, the end user may be allowed to define a time bounded threshold that represents a maximum period of time in which a backup must be successfully executed before the compliance schema is considered violated.

In some instances, end users may be allowed to set network connectivity thresholds and/or entitlement capacity thresholds. These and other advantages of the present technology will be discussed in greater detail herein.

Referring now to FIG. 1, there is depicted a schematic diagram of an exemplary architecture 100 for practicing the present technology. Architecture 100 may include a plurality of computing devices that may include an end user computing device 105. It will be understood that any of the end user computing device, hereinafter "computing device 105" may be operatively connected to a replication receiver system 110, which may comprise a local or remote replication receiver system. The end user computing device 105 and the replication receiver system 110 may be communicatively coupled with each another via a network connection 115, such as the Internet etc.

According to some embodiments, the end user computing device 105 and the replication receiver system 110 may reside on the same machine. Thus, in some instances, the network connection 115 may not be required to communicatively couple the end user computing device 105 and the replication receiver system 110.

In some instances, the replication receiver system 110 may communicatively couple with a plurality of end user computing devices.

Generally speaking, the replication receiver system 110 provides file replication services for files that reside on the end user computing device 105. In some instances, the end user computing device 105 may connect to multiple replication receiver systems. In some instances, the replication receiver system 110 may connect to multiple end user computing devices. In some instances, the replication receiver system 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners. In some instances, these systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real time, sometimes dramatically. The nature and extent of these variations typically depend on the type of business associated with the user.

In greater detail, the replication receiver system 110 may include one or more VPN devices adapted to receive information from the gateway router of the end user computing device 105. In some embodiments, the network connection 115 may include an Ethernet switch operatively coupling the VPN devices to a remote replication receiver system 110 adapted to execute at least a portion of methods for replicating files. The replication receiver system 110 may also include disaster recovery servers, physical media input servers, and one or more virus scanning servers.

It will be understood that the primary storage devices for the replication receiver system 110 may include, for example, RAID redundant storage servers, although other types of servers that would be known to one of ordinary skill in the art with the present disclosure before them are likewise contemplated for use in accordance with the present technology.

In some embodiments, the replication receiver system 110 may comprise one or more processors and logic encoded in one or more tangible media for execution by the one or more processors. Generally described, the replication receiver system 110 may be constructed similarly to the computing device 800 described in greater detail herein relative to FIG. 8.

According to some embodiments, the logic may include instructions that when executed by the processor(s) of the replication receiver system 110 perform operations including establishing a compliance schema for one or more computing devices. Again, a compliance schema may be generally described as comprising a time bounded threshold that defines a maximum period of time in which a backup must be successfully executed before the compliance schema is considered violated. For example, a backup threshold of an hour may be established for a computing device, although one of ordinary skill in the art will appreciate that other time frames may also be utilized. Furthermore, the backup threshold may be specific to the day of the week or may be generally applied to each day. For example, an hour threshold may be established for business days (e.g., Monday-Friday), while a second threshold of every eight hours may be established for weekend days (e.g., Saturday and Sunday). It will be understood that the backup threshold may be selectively varied as desired. Thus, a compliance schema may include a single static threshold, a set of static thresholds, or alternatively a dynamic threshold. An exemplary dynamic threshold may be used to selectively modify the compliance schema depending on a variety of factors such as computing device workload and network bandwidth availability, which are both dynamic properties. For example, an increase in workload of a computing device, as detected by the replication receiver system 110 or filter driver may indicate that more frequent changes are occurring to the file system of the computing device. Thus, an increase in workload may be utilized as the basis for selectively decreasing the backup interval for the computing device. That is, backups of the computing device may be obtained more frequently because the file system may be undergoing rapid modifications. Exemplary filter drivers and methods of use that detect changes to the file system of a computing device are described in co-pending U.S. patent application Ser. No. 13/671,498, filed on Nov. 7, 2012, entitled "Efficient File Replication," which is hereby incorporated by reference herein in its entirety.

Again, it is noteworthy that a compliance schema may include not only the time bounded interval that defines the maximum time between backup executions, but also network connectivity thresholds and entitlement capacity thresholds, or any combinations or permutations thereof. Each of these features will be described in greater detail below with reference to FIGS. 2-4B.

In some instances, the features of the present technology may be implemented via graphical user interfaces (GUI) that are generated by the replication receiver system 110. Thus, in some instances, the logic may include instructions that when executed by the processor(s) of the replication receiver system 110 perform operations including generating graphical user interfaces that allow an end user to specific compliance schema parameters for a compliance schema.

Figure 3:
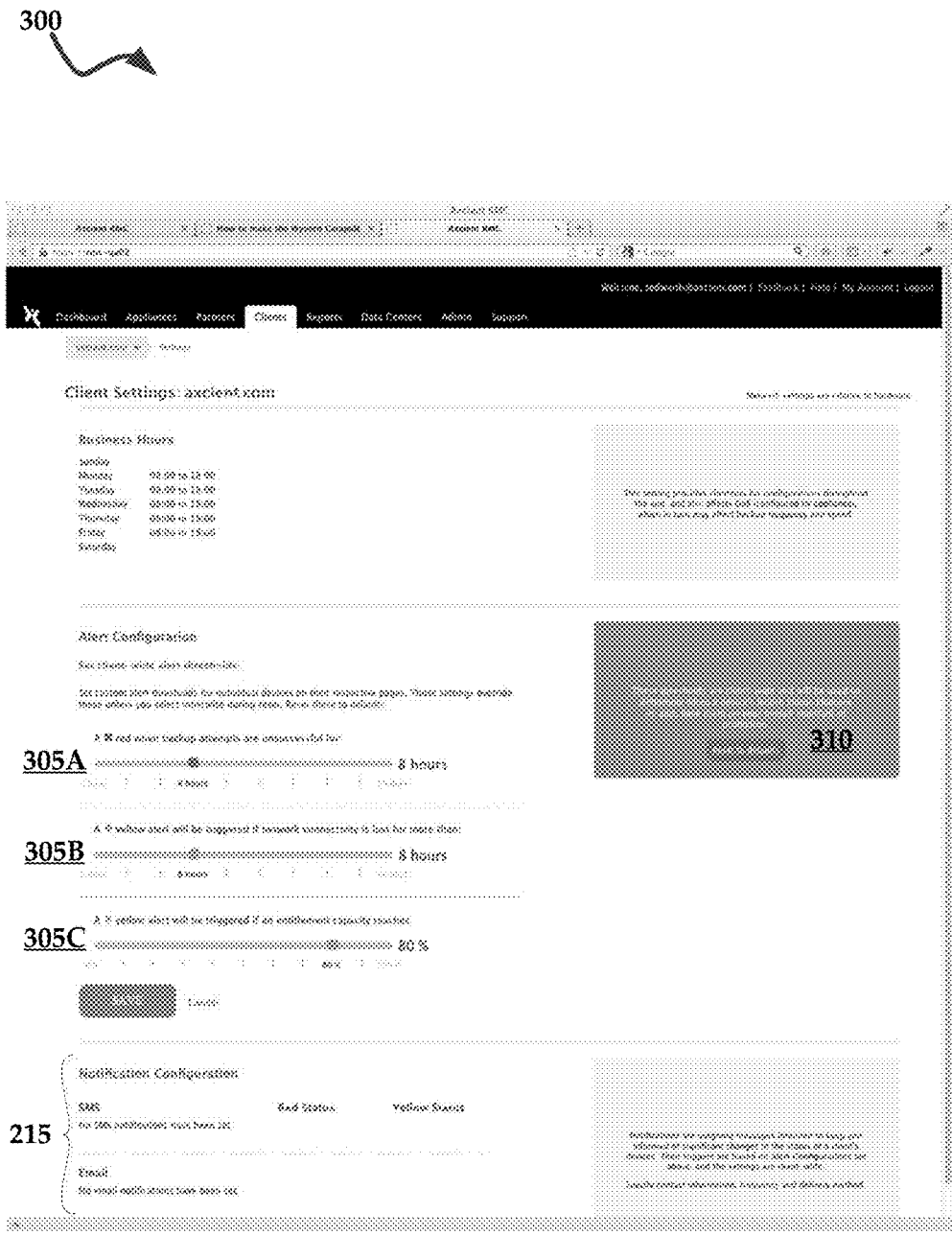
FIG. 3 is an exemplary graphical user interface in the form of an alert configuration editing interface.

FIGS. 2 and 3 illustrate exemplary graphical user interfaces that may be utilized to establish a compliance schema that may be applied to one or more computing devices. With reference to FIG. 2, an exemplary compliance schema interface 200 is shown as comprising a scheduling section 205, which allows an end user to edit a time schedule, such as a weekly business schedule. The schedule may provide automated compliance scheduling features which are associated with default time intervals. These default time intervals may correspond to hours of operation for a business or an individual.

An alert configuration section 210 is shown as providing indicators 210A-C which represent current levels for the compliance schema in place. For example, level 210A indicates that a maximum time interval for obtaining a backup is eight hours. Stated otherwise, when backup attempts have been at least partially unsuccessful for at least eight hours, the computing device is no longer in compliance with the compliance schema. As illustrated, a red box indicator is shown when the computing device is non-compliant.

Similarly, a network connectivity threshold feature 210B may be set to eight hours. Thus, if network connectivity between the computing device and the replication receiver system 110 is lost for more than eight hours, a yellow diamond indicator may be displayed. In addition, an entitlement capacity feature 210C is set to eighty percent. As reference, if the computing device is allowed to consume a set amount of storage space on the replication receiver system 110, the entitlement capacity threshold relates to the total amount of space available. Thus, a yellow diamond indicator may be displayed when eighty percent of the entitled space available to the computing system has been consumed.

Turning briefly to FIG. 3, an alert configuration editing interface 300 is illustrated. Generally the interface 300 resembles the interface 200 of FIG. 2. When an end user selects an edit button 220 (see FIG. 2), a series of sliders 305A-C that allow the end user to selectively modify the various features of the alert configuration section 210 are displayed. Slider 305A allows the end user to selectively adjust the backup threshold. Slider 305B allows the end user to selectively adjust the network connectivity threshold and slider 305C allows the end user to selectively adjust the entitlement capacity threshold. Once the end user has selectively adjusted the parameters of the compliance schema, the end user may save the schema. Alternatively, the end user may reset the compliance schema to default settings via reset button 310.

Once saved, the compliance schema may be applied to a single computing device, or may be applied to a plurality of computing devices. For example, a compliance schema may be utilized in a corporate setting where the same compliance schema is applied to multiple computing devices within the enterprise. As will be described in greater detail below, in some instances, a compliance schedule may be applied to a plurality of computing devices and one or more custom compliance schedules may be applied to one or more of the plurality of computing devices. Thus, a computing device may be subject to a plurality of compliance schemas.

FIGS. 2 and 3 both illustrate a notification configuration section 215 which allows end users to define not only the type of notifications that are transmitted, but the triggering events associated with the notifications. In general, the notifications may comprise outgoing messages that inform the end user that a computing device or multiple computing devices that are subject to the same compliance schema are not compliant.

In some instances, short message service (SMS) or email alerts may be transmitted to an end user, such as a system administrator, a device owner, or another responsible party. Notifications associated with both red and yellow indicators may be transmitted, logged, and displayed in the notification configuration section 215. As with the alert configuration section, the features of the notification configuration section 215 may be selectively adjusted by the end user when notification edit button 220 is selected.

Figure 4A:
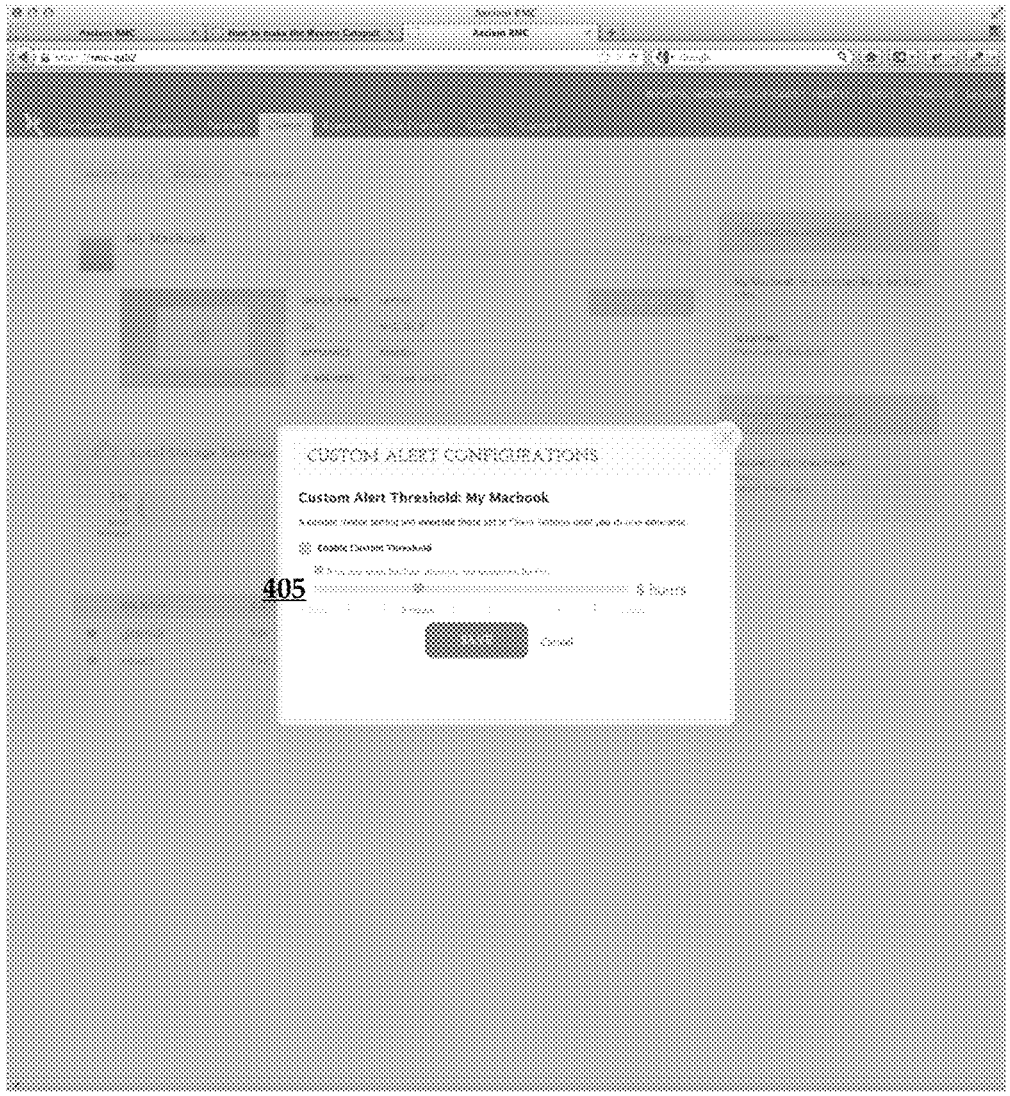
FIGS. 4A and 4B collectively illustrate exemplary graphical user interfaces that allow end users to create custom compliance schemas.
Figure 4B:
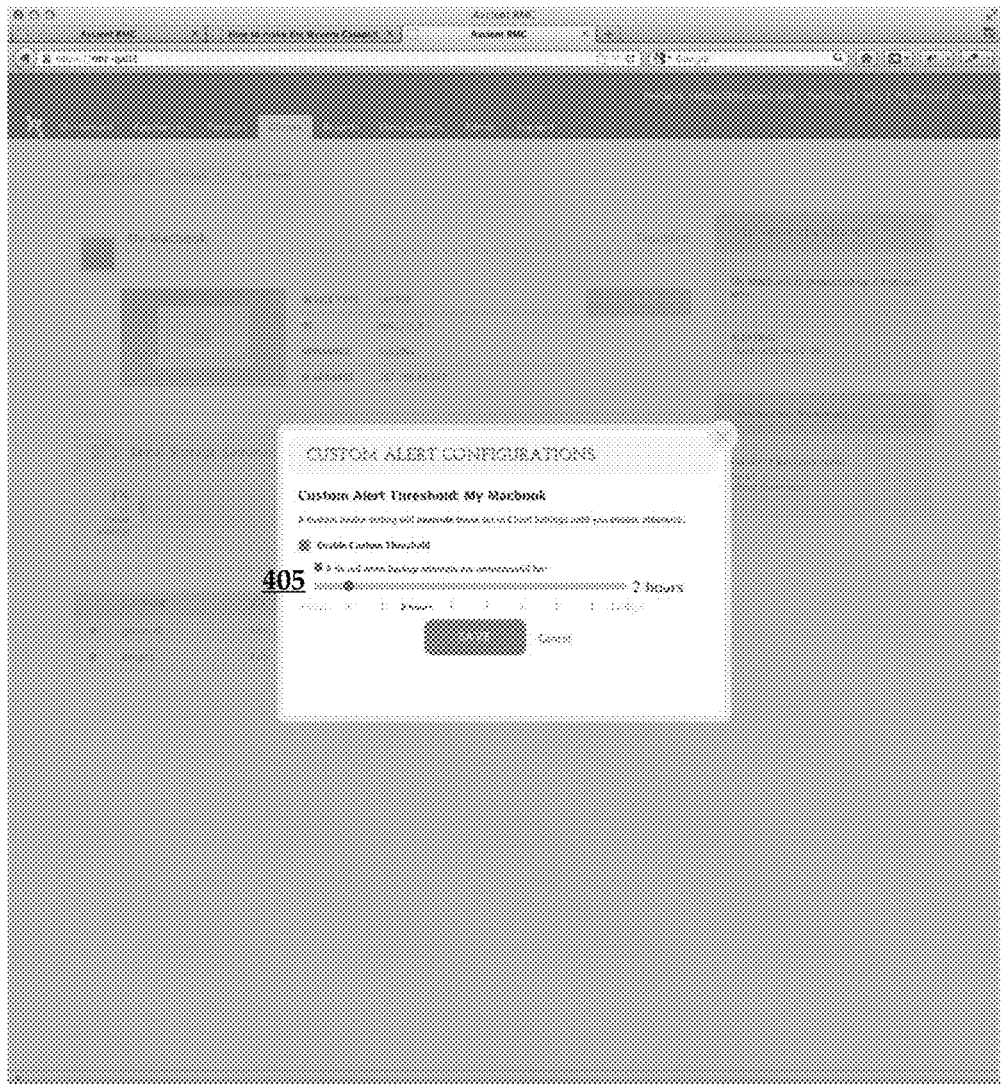

FIGS. 4A and 4B illustrate exemplary GUIs that allow end users to create custom compliance schemas. FIG. 4A shows a custom alert configuration interface which shows that for "My Macbook" a backup attempt threshold is set to eight hours, via slider 405. FIG. 4B shows that the slider 405 has been selectively adjusted such that the backup attempt threshold is set to two hours.

Once the compliance schedule has been applied to the computing device, the logic may include instructions that when executed by the processor(s) of the replication receiver system 110 perform operations including monitoring the backup services or backup status of the computing device and comparing the same to the compliance schema to determine a protection status for the computing device. In some instances, determining a protection status may include interrogating the replication receiver system 110 to determine a backup status for each of the plurality of computing devices. In other instances, determining a protection status may include interrogating a local replication appliance which is communicatively coupled with the replication receiver system 110.

For example, the replication receiver system 110 may determine previous successful or unsuccessful attempts by the replication receiver system 110 to obtain a backup (e.g., snapshot and/or incrementals) from the computing device. In other instances, such as when the computing device (or a local backup appliance) transmits the backup to the replication receiver system 110 according to a backup schedule, the replication receiver system 110 may compare a backup interval (e.g., expected backup data for a given time period) for the computing device to backup data which is actually received by the replication receiver system 110. If an insufficient amount of backup data is received by the replication receiver system 110 when compared to the backup interval, the computing device may be assigned a protection status of non-compliant. Stated otherwise, if a successful backup has not been received within the defined backup interval (see alert configuration section 210, level 210A of FIG. 2), the computing device may be assigned a protection status of non-compliant. If a computing device is non-compliant due to a failure to backup the computing device within the guidelines included in the backup interval, the protection status may include a red indicator.

Similarly, if network connectivity has been lost between the computing device and the replication receiver system 110 for a period of time that exceeds the established network connectivity threshold, the protection status for the computing device may be categorized as non-compliant. If a computing device is non-compliant due to network connectivity issues, the protection status may include a yellow indicator associated with network connectivity.

According to some embodiments, if a computing device is non-compliant due to entitlement capacity issues, the protection status may include a yellow indicator associated with entitlement capacity.

Thus, as the compliance schema may be multi-faceted, including backup, connectivity, and/or capacity features, the protection status for a computing device may also be multi-faceted. For example, the protection status for the computing device may indicate that the computing device is compliant with regard to backup data, but is non-compliant as to either (or both) network connectivity and entitlement capacity.

Figure 5:
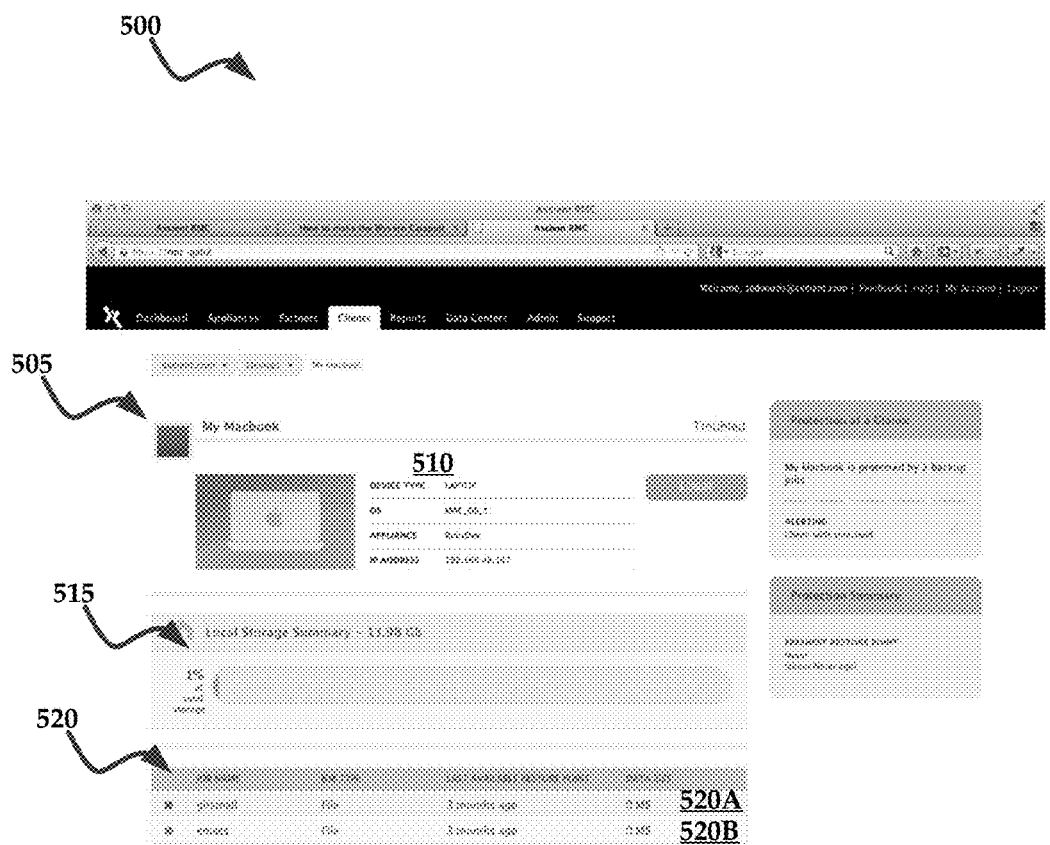
FIG. 5 is an exemplary device protection status interface.

FIG. 5 illustrates an exemplary device protection status interface 500. The interface 500 includes a large protection status indicator 505, which in this case includes a red indicator, which indicates that the computing device is non-compliant as to the backup interval associated with the compliance schedule which is applied to the computing device. A device summary pane 510 includes various identifying information regarding the computing device, such as a device type, operating system, appliance name, and IP address. A capacity indicator 515 indicates the total amount of backup storage space available to the device, as well as an incremental indicator that illustrates storage space consumed.

Jobs list 520 includes each backup which has occurred for the computing device. In this instance, the computing device is subject to two backup jobs 520A and 520B, also referred to as compliance schemas. Backup job 520A is shown as being non-compliant, while backup job 520B is shown as compliant. This discrepancy may be due to various issues which prevent backup job 520A from occurring. For example, the replication receiver system associated with backup job 520A may be offline. As mentioned previously, backup job 520A may include a custom compliance schedule, whereas backup job 520B may include a generic compliance schema. Therefore, the computing device is compliant as to the general compliance schema but not the custom compliance schema.

Based upon the non-compliance with backup job 520A, an alert may be transmitted to a system administrator. The system administrator may utilize the alert message to determine that at least a generic backup of the computing device has occurred. Protection status information may be used by the system administrator to quickly and easily identify replication issues within their network, as well as network connectivity and capacity issues.

Figure 6A:
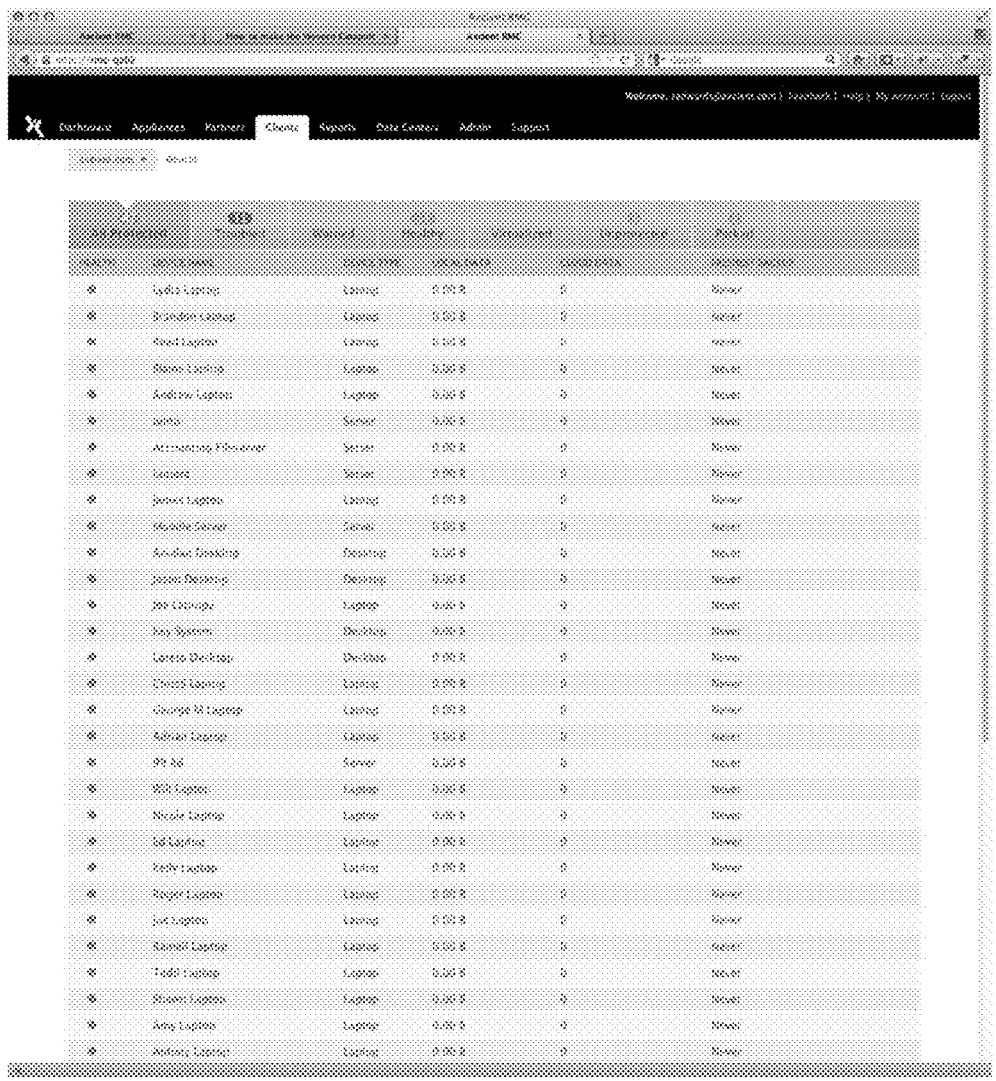

FIGS. 6A-D collectively illustrate exemplary graphical user interfaces that include listings of computing devices which have been categorized according to their protection statuses. FIG. 6A and 6B includes a list of all protected computing systems subject to at least on compliance schema. When an "All Protected" column is selected, a list of computing devices is shown that includes all computing devices which are covered by one or more compliance schemas.

Figure 6C:
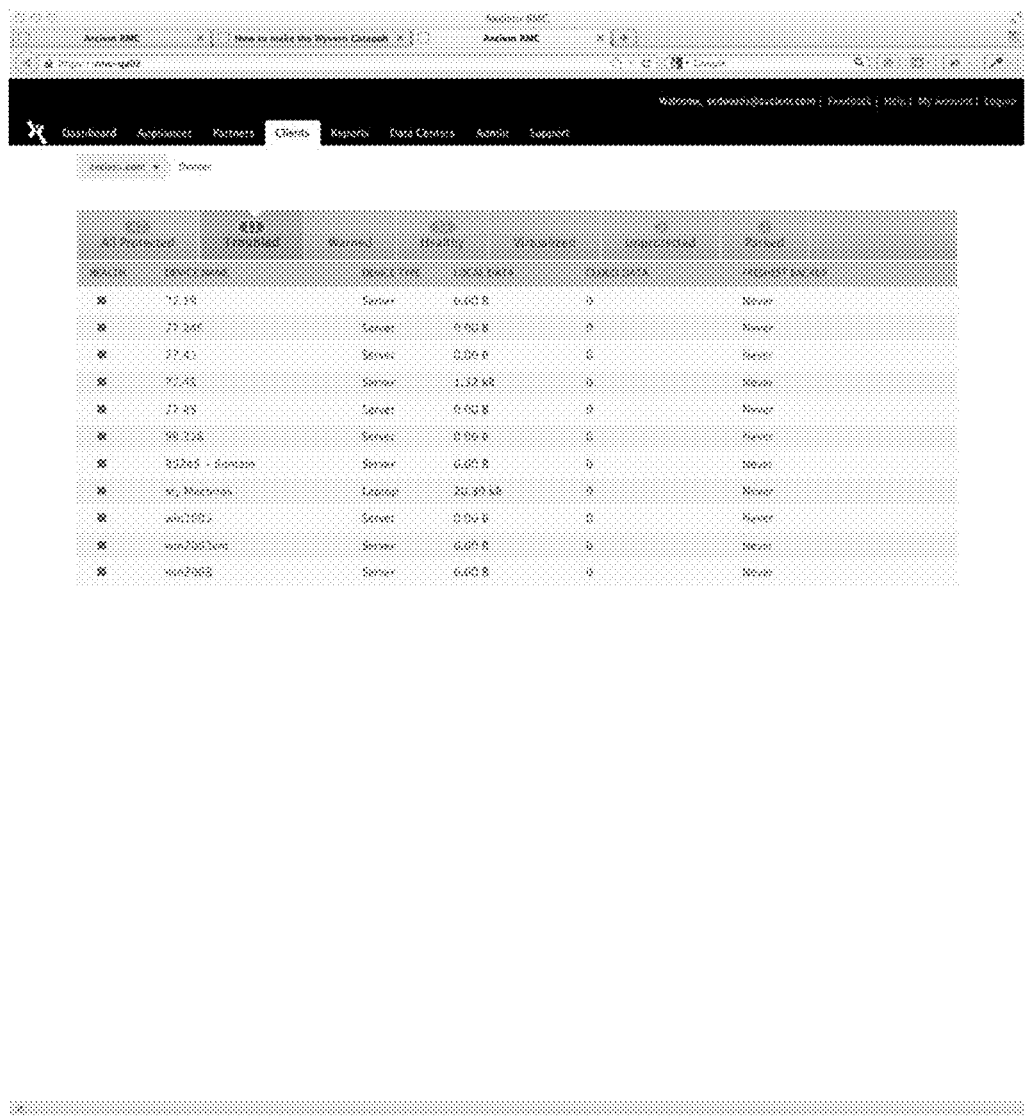
Figure 6D:
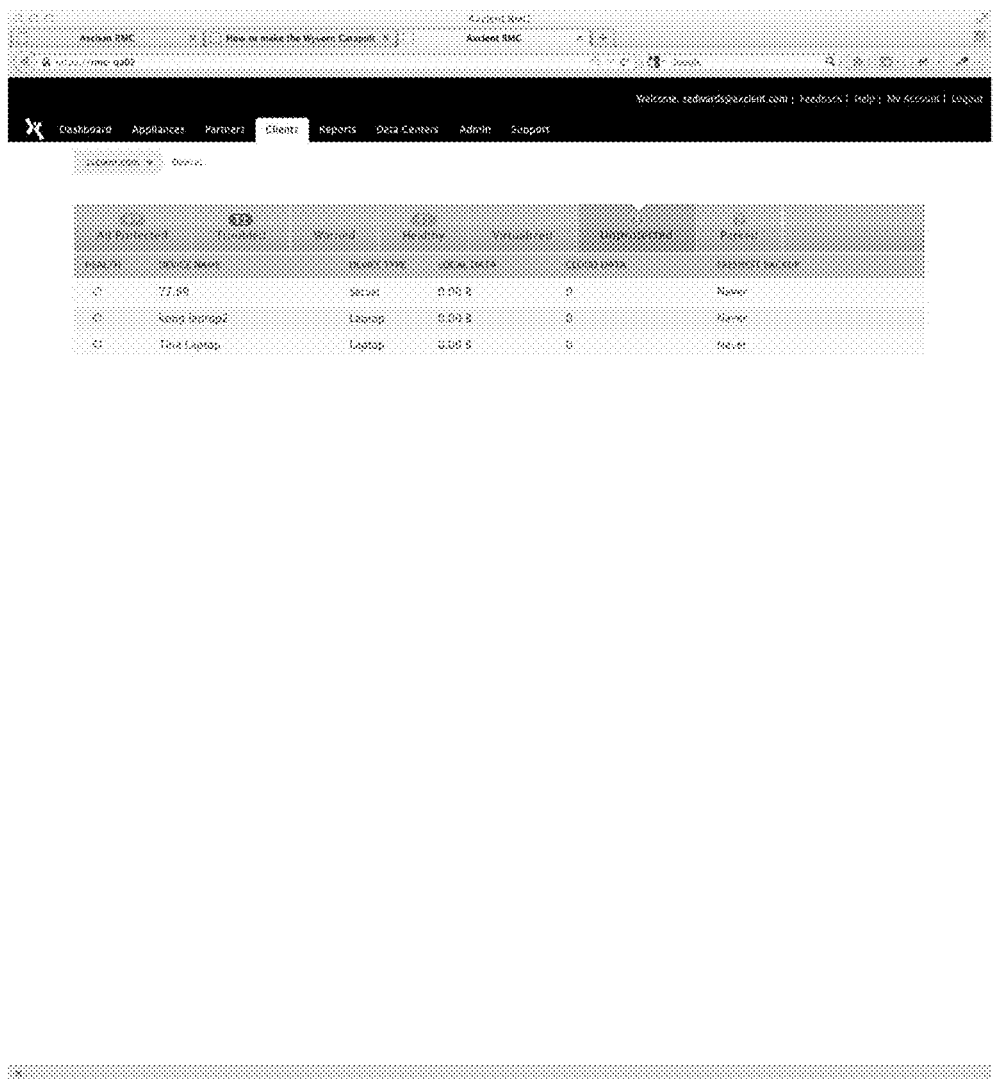

Selecting the "Troubled" column causes the system to display only computing devices which are non-compliant with at least one compliance schema which has been applied to thereto, as shown in FIG. 6C. Selecting the "Unprotected" column causes the system to display only computing devices which are not currently covered by a compliance schema or subject to replication. Although not shown, the "Troubled" column may include computing devices which are compliant with the compliance schema, but have indications that non-compliance of the computing device is forthcoming. For example, if a backup threshold for a computing device is set to eight hours the device may be compliant, but an examination of the backup status of the computing device indicates that the computing device has not been successfully backed up in over six hours, and a backup schedule that is applied to this computing device requires that the device execute a backup at least every three hours.

Thus, it is noteworthy to mention that the backup schedule that applies to the computing device, which indicates how often replication of the computing device should occur, may or may not correspond to the backup interval established for the compliance schema. For example, the end user may desire to backup the computing device more frequently than required by the system administrator, who establishes the compliance schema.

According to some embodiments, the compliance schema may be stored as a template that may be exported for use with various other applications such as a project planning application or other suitable application. Thus, various default compliance schema templates may be provided to an end user and the end user may select an appropriate template. In some instances, the system may provide a template to a second client for use with a second computing device, the second client being different from a first client that owns a first computing device that utilized the same compliance schema.

It is noteworthy that while the preceding described embodiments referred to the replication receiver system 110 as being used to implement various features of the present technology, a separate or standalone compliance and monitoring system which performs the above-described features may also likewise be utilize in accordance with the present technology.

FIG. 7 is a flowchart of an exemplary method 700 for determining and displaying a protection status for a computing device. In some instances, the method 700 may include a step 705 of defining a compliance schema for the computing device. As described above, the compliance schema may include threshold levels for backup, network connectivity, and/or entitlement capacity. The compliance schema features may be defined using the graphical user interfaces described above with regard to FIGS. 3-5.

Next, the method 700 may comprise a step 710 of assigning (e.g., associating or applying) a compliance schema to a computing device, as well as a step 715 of obtaining backup information for the computing device. In some instances, backup information may include reviewing a log of successful or unsuccessful backup attempts associated with the computing device over a given period of time. For example, the period of time may include the most recent interval of time that corresponds to the backup threshold interval.

In some instances, the method 700 may comprise a step 720 of comparing the backup information to the compliance schema to determine a protection status for the computing device. Again, the protection status may indicate compliance or non-compliance with the various facets of the compliance schema such as backups, network connectivity, and/or entitlement capacity.

When a computing device is determined to be non-compliant with the compliance schema applied thereto the method 700 may comprise a step 725 of generating a compliance message or "alert message" based upon the comparison. The method may include a step 730 of transmitting the compliance message to a monitoring device. In some instances, the method may include a step 735 of generating a graphical user interface that includes a visual indicator that represents the protection status of the computing device.

It will be understood that the foregoing description contemplates displaying the protection status of a particular computing device; the method may also extend to generating GUIs that allow users to define a compliance schema for each device, as well as a compliance schema against a parent entity, or against all client devices for a user, or even a Site Location.

When the compliance schema is defined against a parent entity, the parent's compliance entity applies to all "child" devices that don't have a compliance schema defined specifically for them.

Figure 8:
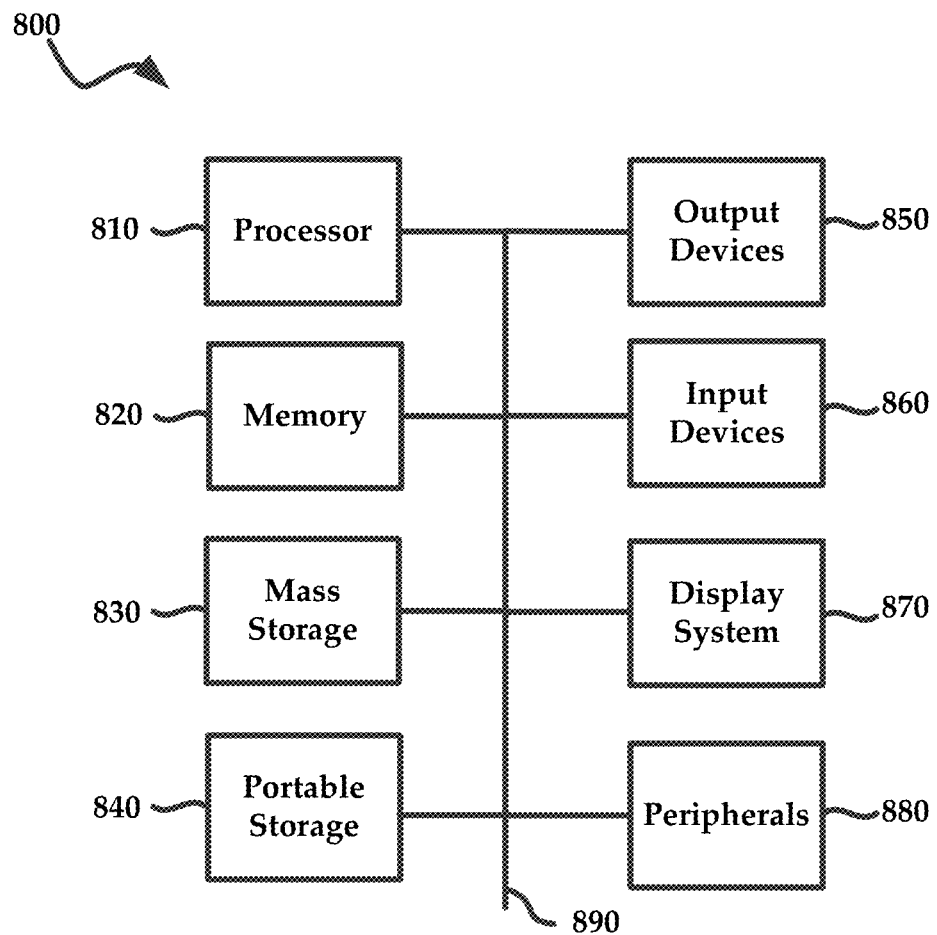
FIG. 8 illustrates an exemplary computing device that may be used to implement embodiments according to the present technology.

FIG. 8 illustrates an exemplary computing device 800 that may be used to implement an embodiment of the present technology. The computing device 800 of FIG. 8 includes one or more processors 810 and memory 820. Main memory 820 stores, in part, instructions and data for execution by processor 810. Main memory 820 can store the executable code when the computing device 800 is in operation. The computing 800 of FIG. 8 may further include a mass storage device 830, portable storage medium drive(s) 840, output devices 850, user input devices 860, a graphics display 870, and other peripheral devices 880.

The components shown in FIG. 8 are depicted as being connected via a single bus 890. The components may be connected through one or more data transport means. Processor unit 810 and main memory 820 may be connected via a local microprocessor bus, and the mass storage device 830, peripheral device(s) 880, portable storage device 840, and graphics display 870 may be connected via one or more input/output (I/O) buses.

Mass storage device 830, which may be implemented with a magnetic disk drive, an optical disk drive, and/or a solid-state drive is a non-volatile storage device for storing data and instructions for use by processor unit 810. Mass storage device 830 can store the system software for implementing embodiments of the present technology for purposes of loading that software into main memory 820.

Portable storage device 840 operates in conjunction with a portable non-volatile storage medium, such as a floppy disk, compact disk or digital video disc, to input and output data and code to and from the computing device 800 of FIG. 8. The system software for implementing embodiments of the present technology may be stored on such a portable medium and input to the computing device 800 via the portable storage device 840.

Input devices 860 provide a portion of a user interface. Input devices 860 may include an alphanumeric keypad, such as a keyboard, for inputting alphanumeric and other information, or a pointing device, such as a mouse, a trackball, stylus, or cursor direction keys. Additionally, the computing 800 as shown in FIG. 8 includes output devices 850. Suitable output devices include speakers, printers, network interfaces, and monitors.

Graphics display 870 may include a liquid crystal display (LCD) or other suitable display device. Graphics display 870 receives textual and graphical information, and processes the information for output to the display device.

Peripherals 880 may include any type of computer support device to add additional functionality to the computing device. Peripheral device(s) 880 may include a modem or a router.

The components contained in the computing device 800 of FIG. 8 are those typically found in computing devices that may be suitable for use with embodiments of the present technology and are intended to represent a broad category of such computer components that are well known in the art. Thus, the computing device 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    interrogating a replication receiver system to determine a backup status for a first computing device;
    assigning a protection status to the first computing device based upon
        a comparison of the backup status and a compliance schema for the first computing device, wherein the compliance schema comprises a backup interval for the first computing device based upon at least one of a time-bounded interval between backups,
        a network connectivity threshold, an entitlement capacity, and a computing device workload;
    monitoring a first computing device workload of the first computing device using a filter driver agent installed on the first computing device;
    dynamically adjusting the backup interval when the first computing device workload is increasing or decreasing as detected by the filter driver agent; and
    generating a graphical user interface that illustrates the protection status.

2. The method according to claim 1, wherein the protection status indicating whether backup services for the first computing device are being executed in accordance with the compliance schema.

3. The method according to claim 2, wherein the time-bounded threshold defines a maximum period of time in which a backup must be successfully executed before the compliance schema is considered violated.

4. The method according to claim 3, further comprising generating the compliance schema from user-defined thresholds.

5. The method according to claim 4, further comprising storing the compliance schema as a template.

6. The method according to claim 5, further comprising providing the template to a second client for use with a second computing device, the second client being different from a first client that owns the first computing device.

7. The method according to claim 1, further comprising transmitting the protection status to a monitoring device utilized by an end user to locate and determine an explanation for why the first computing device has not been backed up properly.

8. The method according to claim 1, wherein the backup status comprises any of network connectivity information, backup attempt information, entitlement capacity information, and any combination thereof.

9. A system, comprising:

one or more processors; and logic encoded in one or more tangible media for execution by the one or more processors and when executed operable to perform operations comprising:

interrogating a replication receiver system to determine a backup status for a first computing device;

assigning a protection status to the first computing device based upon a comparison of the backup status and a compliance schema for the first computing device, wherein the compliance schema comprises a backup interval for the first computing device based upon at least one of a time-bounded interval between backups, a network-connectivity threshold, an entitlement capacity, and a computing device workload;

monitoring a first computing device workload of the first computing device using a filter driver agent on the first computing device, the filter driver agent being installed in a layer of the operating system of the first computing device and detecting write operations occurring in the operating system;

dynamically adjusting the backup interval when the first computing device workload is increasing or decreasing based on changes in the computing device workload measured by the filter driver agent; and generating a graphical user interface that illustrates the protection status.

10. The system according to claim 9, wherein the logic when executed is further operable to perform operations comprising applying a compliance schema to the first computing device.

11. The system according to claim 10, wherein the logic when executed is further operable to perform operations comprising applying a custom compliance schema to the first computing device.

12. The system according to claim 11, wherein the logic when executed is further operable to perform operations comprising transmitting an alert message when the protection status indicates that the first computing device has not been backed up according to the compliance schema.

13. The system according to claim 12, wherein the time-bounded threshold defines a maximum period of time in which a backup must be successfully executed before the compliance schema is considered violated.

14. The system according to claim 13, wherein the logic when executed is further operable to perform operations comprising selectively modifying the compliance schema using dynamic thresholds.

15. The system according to claim 14, wherein the logic when executed is further operable to perform operations comprising storing the compliance schema as a template.

16. The system according to claim 15, further comprising providing the template to a second client for use with a second computing device, the second client being different from a first client that owns the first computing device.

17. A method, comprising:

interrogating a replication receiver system to determine a backup status for each of a plurality of computing devices;

assigning a protection status to each of the plurality of computing devices based upon a comparison of the backup status for each of the plurality of computing devices and a compliance schema for each of the plurality of computing devices, wherein the compliance schema comprises a backup interval for each of the plurality of computing devices based upon at least one of a time-bounded interval between backups, a network-connectivity threshold, an entitlement capacity, and a computing device workload, and wherein if an insufficient amount of backup data is received by the replication receiver system when compared to a backup interval in a compliance schema, a computing device of the plurality of computing devices associated with the insufficient amount of backup data is assigned a protection status of non-compliant;

sorting the plurality of computing devices into groups according to their protection statuses;

generating a graphical user interface that includes one or more lists that comprise the plurality of computing devices which have been sorted according to their protection statuses; and automatically taking a predetermined action with respect to at least one of the plurality of computing devices in the one or more lists based upon the protection statuses.

18. The method according to claim 17, wherein the predetermined action comprises:

determining whether or not backup services for the plurality of computing devices are being executed in accordance with the assigned compliance schema established for the plurality of computing devices; and transmitting alert messages to a monitoring device when the backup services are not being executed in accordance with the assigned compliance schema.

19. The method according to claim 17, further comprising transmitting the alert message to the monitoring device via at least one of an SMS message and an email.

* * * * *